Sept. 5, 1961 R. L. WATHEN 2,999,239
APPARATUS FOR DETERMINING THE VERTICAL
Filed Feb. 26, 1949

INVENTOR
ROBERT L. WATHEN
BY
Herbert H. Thompson
HIS ATTORNEY.

United States Patent Office
2,999,239
Patented Sept. 5, 1961

2,999,239
APPARATUS FOR DETERMINING THE VERTICAL
Robert L. Wathen, Hempstead, N.Y., assignor to Sperry Rand Corporation, a corporation of Delaware
Filed Feb. 26, 1949, Ser. No. 78,547
3 Claims. (Cl. 343—117)

This invention relates to means for and methods of determining the vertical from the properties of radiant energy and differs from well-known systems of radio direction finding in that use is made of properties of the electromagnetic energy which exist at right angles to the direction of its propagation, whereby an indication of the vertical may be derived from generally horizontally directed electromagnetic energy.

As has been known since the time of Clerk Maxwell, light and other electromagnetic radiations are accompanied by transverse electric and magnetic vibrations that are normal to the direction of propagation, and it is an object of the present invention to use the transverse electrical vibrations to provide a vertical reference such as may be employed to control a gyroscopic vertical in response to the direction of such vibrations.

It is a further object of the invention to provide apparatus to indicate the direction of the transverse electrical vibrations of polarized electromagnetic radiation, be these radiations either specifically generated for the purpose, or already in existence, such as might be used for communication or other purposes.

A further object of the invention is to control the position of a vertical gyroscope, automatic pilot, or other apparatus automatically by reference to the aforementioned properties of electromagnetic radiation.

In commercial long-distance long wave radio communication, two modes of propagation are recognized. There is the sky-wave with generally rectilinear propagation, which is reflected back to the earth from the ionosphere. There is also the ground wave which follows the curved surface of the earth. In many cases, the two modes may be received by a single receiver located in any arbitrary position. In established hyperbolic navigation radio systems, several advantages have been found for the use of the ground wave. The most important advantage concerns the constancy of the signal intensity received by use of the ground wave; that is, day and night propagation are equally reliable when ground wave signals are used in such hyperbolic navigation position determining systems. Also, summer and winter reception conditions are almost uniformly good when using the ground wave signals, whereas the sky waves are often not present. These advantages of the ground wave signals are also important for use in the present invention.

If, for instance, it were desired to use the present invention to obtain an indication of the true vertical in an aircraft over the ocean, it would be desirable to take advantage of radiation at a low frequency already emitted by various stations, for hyperbolic navigation purposes. Certain Loran stations, for example, operate at about 180 kilocycles; others operate near 2,000 kilocycles. In normal circumstances, both sky waves and ground waves are sometimes received from these Loran transmitter stations; but owing to the difference in time of propagation along the two routes, it is both desirable and possible to separate the two sorts of waves received from any one station in the receiver, and to use only the ground wave for navigation purposes. Such methods, however, form part of the art of Loran construction and per se are not a part of the present invention.

Dr. F. E. Terman, in his text entitled "Radio Engineering," 2nd ed., page 598, says: "The ground wave is always vertically polarized . . . The vertical polarization exists because the conducting earth short-circuits any horizontally polarized component of the wave and hence wipes out the electrostatic flux of a horizontally polarized ground wave." Terman also notes that the front of the ground wave has a slight tilt near the earth in the direction of propagation, because energy is continually refracted toward the earth to replace earth losses. Calculations based on the article by K. A. Norton, "Propagation of Radio Waves Over the Surface of the Earth and in the Upper Atmosphere," which appeared in the proceedings of the Institution of Radio Engineers, 25, September 9, 1937, show that a wave front for two megacycle energy will be tilted about one-tenth of a degree when passing over the surface of the ocean, and about 15° in passing over the most unfavorable types of terrain likely to be encountered. At a frequency of 200 kilocycles, these figures would be about 0.039° and 4°, respectively.

It should be pointed out, however, that the tilt of the wave front occurs close to the earth's surface only, and decreases rapidly with increasing elevation, so the electric vector is substantially vertical even over the worst terrain at any altitude exceeding one or two wavelengths. It follows that an indication of the vertical derived according to this invention would be accurate within 0.04° at sea level, and would have at least a comparable accuracy over the worst terrain at moderate altitudes.

Hence, as applied to the problem of determining the vertical, my invention broadly consists in using a radio receiver to receive ground waves from one or more transmitter stations, said receivers being adapted to give signals indicating the vertical direction of the electric vector of electromagnetic energy.

Other objects and advantages of the invention will appear more fully hereinafter from the following description in conjunction with the accompanying drawings in which.

Figure 1:
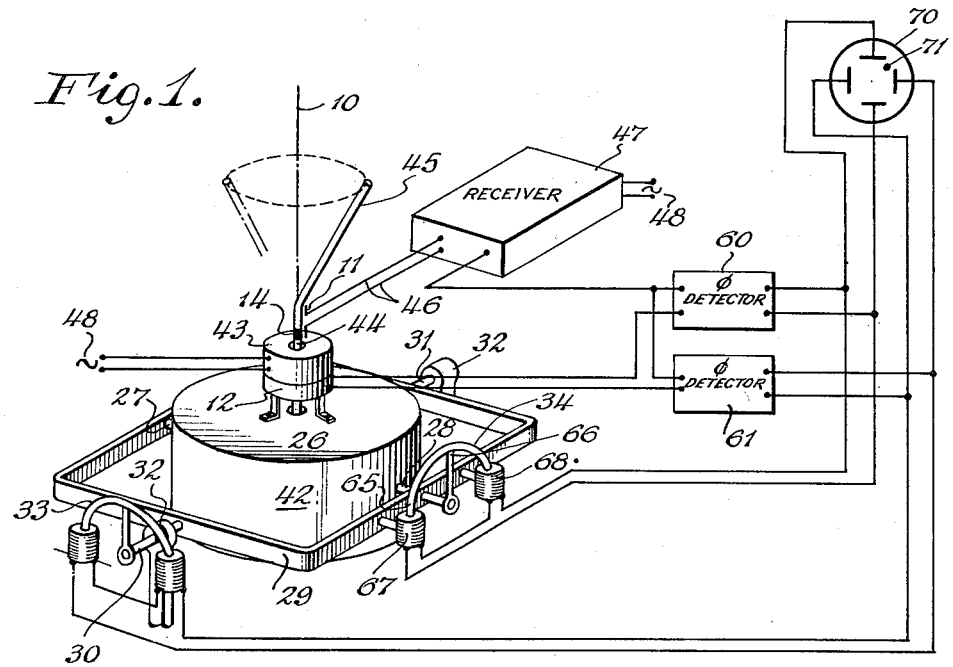
FIG. 1 shows a system adapted to indicate the vertical from signals received from a radio station.

FIG. 1 shows one embodiment of the invention in which the signals received from a radio transmitter station are used to erect a gyroscope controlling a platform that is to be maintained in a horizontal position. The platform is shown at 26, mounted in a gimbal ring 29 by pivots 27, 28, said gimbal ring being carried by pivots 30, 31 in a frame 32 fixed to the craft. Platform 26, which is normally horizontal, carries a conventional vertical gyroscope rotor (not shown) housed in casing 42, in which the rotor is spun about a normally vertical axis by a conventional built-in electric rotor.

The gyro casing 42 carries on its upper end a second and independent electric motor 43 with a rotating vertical shaft 44. Said shaft 44 carries an antenna probe 45 set at an angle of about 30° from the axis of rotation 10. Thus, when the antenna probe 45 is rotated, it sweeps a cone about the axis of rotation 10. If desired, the motor driving the gyro rotor and that rotating antenna 45 may be the same. The axis 10 is normally vertical, and if it inclines from the vertical, the gyro is caused to precess by the means described hereinafter so as to restore spin axis 10 to the vertical position. The antenna 45 is insulated from the rotor shaft 44 by appropriate insulating material 14.

Signals received by the antenna 45 are transmitted through slip rings, or by well-known rotary capacity coupler means indicated schematically at 11, through leads 46 to receiver 47. For the sake of convenience, the receiver 47 may also be excited from the same alternating voltage supply 48 as is used to drive antenna spin motor 43. In the absence of sky wave signals, the receiver 47 may receive ground wave signals originating from a conventional continuous wave transmitter station (not shown); receiver 47 may also be adapted to receive either pulsed or continuous wave signals, at the will of the operator and as dictated by attendant circumstances.

The electromagnetic oscillations which reach the antenna are modulated by the antenna rotation to a depth depending on the angle between the rotation axis 10 and the vector of electric polarization of the received energy. This vector, as hereinbefore explained, marks substantially the true vertical. The phase of this modulation depends on the azimuth of the plane containing the true vertical and the axis of rotation 10.

Figures 2, 3:
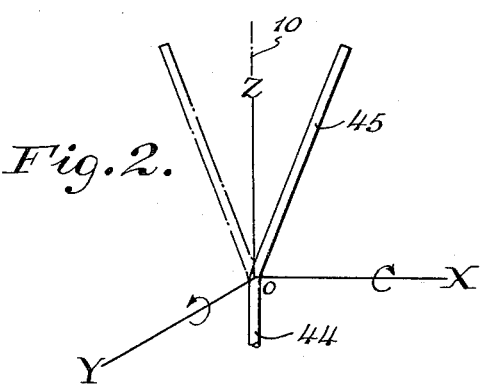
FIG. 2 is an elevation outline drawing of the rotating antenna of FIG. 1 in the normal position.
FIG. 3 shows the antenna of FIG. 2 before erection is complete.

This may be seen from FIG. 2 in which shaft 44 and axis 10 are vertical and lie along OZ which represents the electric vector of the electromagnetic waves. Since the probe 45 now makes a constant angle with the electric vector, the received signal will have the same strength at all positions in azimuth of the probe and no modulation will occur.

In FIG. 3 however, axis 10 is inclined from OZ in the plane ZOX, and when probe 45 is in the same plane, in the position drawn in solid lines, it makes a maximum angle with OZ and the signal delivered to receiver 47 will be a minimum. When the probe has been rotated 180° round axis 10 to the position shown in broken lines it will make a minimum angle with OZ and the signal will be at its maximum. The modulation will therefore be sinusoidal at the frequency of antenna rotation, and the maxima and minima will occur when the probe 45 is in the vertical plane containing the axes 10 and OZ.

The radio receiver 47 includes a suitable detecting means for recovering the modulation envelope of the electromagnetic oscillations received by the spinning antenna probe 45. For example, it may include a superheterodyne type of receiver having a first detector, a local oscillator, an intermediate frequency amplifier channel, and a second detector with suitable amplifiers for converting the input wave trains into a sine wave having the same frequency as the frequency of rotation of antenna 45. The antenna 45 is so constructed that it is at an angle to the axis of rotation 10 of the shaft 44 in order that the receiver output will vary in magnitude and in phase in accordance with the orientation of the axis 10 with respect to the electric vector of the energy being received and to the instantaneous angular position of the shaft 44.

In order to obtain reference voltages requisite for measurement or indication of the orientation of the axis 10 with respect to the electric vector, a two-phase generator 12 is provided, the rotor of which is rotated synchronously with the antenna probe 45 and the motor 43 while the stator is fixed to the gyro casing 42. As represented schematically in the drawing, the shaft 44 is the common shaft of the driving motor 43 and the generator 12, although it will be understood that in actual practice, a different construction may be employed.

The variable amplitude variable phase alternating signal output of receiver 47 is applied to the input of a pair of phase sensitive detectors 60 and 61. Reference sine wave voltages from the two-phase generator 12 are also supplied to separate inputs of the phase detectors 60 and 61. The reference generator 12 is initially phased so that one voltage phase serves as a reference for tilt of platform 26 about pivots 27, 28 and the other phase of the output voltages serves as a reference for tilt of the platform 26 about pivots 30, 31.

Figure 4:
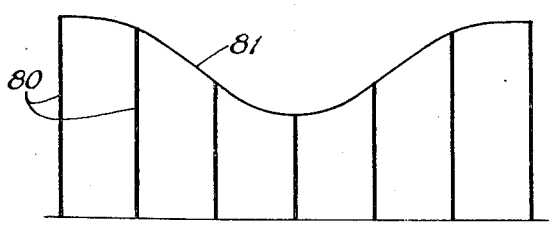
FIG. 4 is an explanatory graph.

In the system of FIG. 1 the receiver 47 may receive from a ground transmitter (not shown) pulses of electromagnetic energy which are separated by time intervals of considerable duration in relation to the length of the pulse or train of oscillations. In a representative system, a repetition rate of 100 pulses per second may be employed with a pulse duration of 40 microseconds. Corresponding pulses are received by the antenna 45 and by the pulse receiver 47 when the transmitted energy is intercepted. Such pulses are represented by the vertical lines 80 in FIG. 4. The antenna 45 is so constructed that the strength of the received pulses is greater when the antenna 45 is aligned with the vertical electric vector than when there is an angle therebetween. Since the antenna probe 45 makes a fixed angle with the axis of rotation 10, the rotation or spin of the antenna 45 will produce a variation in the strength of the received pulses. This variation or spin modulation will have a frequency corresponding to the speed of rotation of the antenna 45. For example, if this rotation is 20 revolutions per second, the spin frequency modulation will also be at a frequency of 20 cycles per second. Such modulation of the received pulses is represented by the modulation envelope 81 in FIG. 4.

Conventional radar locator and target-tracking apparatus employ similar antenna spin reference generation systems, similar detectors of the received signal modulation envelopes, and similar positional servo and indicator control phase-sensitive detectors. In such analogous arts, the means employed in the present invention for the generation of tilt error voltages is well-known; therefore, it is not necessary in disclosing the present invention to describe the details of the apparatus required to perform these functions. In fact, where continuous wave or pulsed signals are to be received, I may prefer to utilize, for instance, a conventional type of demodulator or detector included in the receiver for recovering the modulation envelope 81 and for supplying it to the tilt phase detectors 60, 61. Alternatively, I may employ a system in which the actual received pulses 80 rather than the modulation envelope 81, are supplied to phase detectors 60 and 61, as in the devices described in C. W. Johnstone Patent 2,419,219 for "Phase Responsive Circuits," which patent issued April 22, 1947, and is assigned to the assignee of the present invention.

In this manner, a variable polarity voltage will appear at the output of phase detector 60 corresponding to tilt of platform 26 about the pivots 30, 31. A similar variable polarity voltage will appear at the output of phase detector 61, again corresponding to the degree and to the sense of tilt of the platform 26 about pivots 27, 28. Two torque motors 34, 33 when excited by these respective voltages act on the gyro about the horizontal gimbal axes 30—31 and 27—28, respectively, at right angles to the tilt of the axis of rotation of the antenna probe 45, and cause precession of the gyroscope in a direction to eliminate such tilt. These motors are shown in the drawing, by way of example, as having the form disclosed in L. F. Beach Patent 2,391,442, for "Gyromagnetic Compass," issued December 25, 1945 and also assigned to the present assignee. The torque-exerting means is electromagnetic and includes a curved permanent magnet element 65 mounted on a radially extending arm 66 that is fixed to an extended portion of pivot 28. The cooperating element of the torque motor is constituted of two series-connected solenoids 67 and 68, which are fixed in position on the gimbal ring 29. Magnetic member 65 provides a core or plunger for the respective solenoids and the same is urged either in a counterclockwise or clockwise direction, as viewed in FIG. 1, when the solenoids are rendered effective depending on the polarity of the currents from phase detector 60. The torque motor is consequently operative to exert a torque on, and cause precession of the gyro so as to effect the desired movement of case 42 in a manner well understood in the art. The control of gimbal 29 under the influence of similar torque motor 33 by signals from phase detector 61 is analogous. The control of the described gyro vertical unit in the improved instrument of the present invention is exerted by the torquers 33, 34 and the horizontal position of the platform 26 with respect to the vertical electric vector of the received electromagnetic energy is consequently determined. Since the stator of generator 12 is fixed to the gyro casing 42, any change in the orientation of the gimbal axes will be accompanied by a corresponding change of phase of the generator output with respect to the plane of tilt of the antenna axis 10. These two effects of change of orientation cancel one another so that the torque applied by the motors 33 and 34 will always cause precession of the gyro in such a sense as to reduce the existing tilt.

As in the radar object-tracking system of the above-mentioned Johnstone Patent 2,419,219, separate indicators, such as cathode ray oscilloscopes, may be provided for indicating the orientation of the axis 10 with respect to the electric vector. If desired, a single rectilinear coordinate indicator 70 may be provided which is responsive to signal output from both phase detectors 60 and 61 for producing a moving spot 71, the position of which with respect to the center of the indicator screen indicates the aforementioned deviation between the axis 10 and the vertical electric vector.

The receiver system, as described in the foregoing specification, is useful with continuous or pulsed ground wave signals wherever sky waves are not received. The receiver may be tuned first to one transmitter and then to others to provide a check of the vertical indication, as desired. In the presence of sky wave signals, the effect of these interfering signals may be eliminated by gating all but the desired ground wave signal from the receiver output, or by a related system as described in copending U.S. application of W. Palmer, S.N. 736,648, filed March 24, 1947, now Patent No. 2,683,873, and assigned to the present assignee.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Means for indicating the vertical vector of polarization of received electromagnetic waves, comprising in combination an antenna rotatable about a normally vertical axis, the direction of said antenna making a constant angle with the axis of rotation, a motor for maintaining said antenna in rotation about said axis, a gyroscopically stabilized gimballed platform carrying said antenna and said motor, a receiver for receiving the electromagnetic waves modulated by the rotation of said antenna, a generator of local phase-reference signals having a rotor turning synchronously with the rotation of said antenna, a stator carried by said platform, phase detectors for receiving and comparing said modulated signals and said reference signals, torque motors energized by said phase detectors and arranged to apply torques to the gimballed axes of said gyroscopically stabilized platform to cause precession of the stabilizing gyroscope and erect the axis of rotation of said antenna to the vertical.

2. Means for indicating the vertical, comprising a radio receiver for receiving radio ground waves, a local source of alternating reference signals, a gimballed platform carrying a rotating antenna for receiving and modulating said radio wave, a pair of phase detectors comparing said modulated waves with said reference signals, and a pair of follow-up motors controlled by said phase detectors for erecting said platform about two axes at right angles according to the direction of the vertical electric vector of said waves with respect to the axis of rotation of said antenna to bring said axis to a vertical position.

3. Means for determining the vertical by the energy in radio signals received in a movable craft comprising a platform gimballed to the craft, a pair of follow-up motors active on the gimballed axes for positioning said platform to a predetermined attitude, a radio antenna system mounted on said platform, receiving and phase detecting means sensitive to the angle of displacement of said antenna system from the vertical as defined by the electric vector of the received radio waves and controlling said follow-up motors so as to reduce said angle to zero.

References Cited in the file of this patent

UNITED STATES PATENTS

| | | |
|---|---|---|
| 2,412,612 | Godet | Dec. 17, 1946 |
| 2,417,086 | Proskauer et al. | Mar. 11, 1947 |
| 2,437,251 | Frische et al. | Mar. 9, 1948 |
| 2,446,024 | Porter et al. | July 27, 1948 |
| 2,484,819 | Ferrill | Oct. 18, 1949 |
| 2,484,862 | Streeter | Oct. 18, 1949 |